US012752876B2

(12) United States Patent
Han

(10) Patent No.: US 12,752,876 B2
(45) Date of Patent: Oct. 6, 2026

(54) SELF-POWERED MOTORCYCLE AND BICYCLE

(71) Applicant: AMAZING SUN CO., LTD., Gyeonggi-do (KR)

(72) Inventor: Kyung Hee Han, Gyeonggi-do (KR)

(73) Assignee: AMAZING SUN CO., LTD., Gyeonggi-do (KR)

( * ) Notice: Subject to any disclaimer, the term of this patent is extended or adjusted under 35 U.S.C. 154(b) by 890 days.

(21) Appl. No.: 17/918,021

(22) PCT Filed: Jan. 24, 2022

(86) PCT No.: PCT/KR2022/001183
§ 371 (c)(1),
(2) Date: Oct. 10, 2022

(87) PCT Pub. No.: WO2022/169148
PCT Pub. Date: Aug. 11, 2022

(65) Prior Publication Data

US 2023/0150603 A1 May 18, 2023

(30) Foreign Application Priority Data

Feb. 3, 2021 (KR) ........................ 10-2021-0015288

(51) Int. Cl.
*B62K 11/02* (2006.01)
*B62J 45/00* (2020.01)
(Continued)

(52) U.S. Cl.
CPC ............... *B62K 11/02* (2013.01); *B62J 45/00* (2020.02); *B62K 25/08* (2013.01); *B62K 25/10* (2013.01);
(Continued)

(58) Field of Classification Search
CPC ...... H02K 7/1853; B62K 11/02; B62K 25/08; B62K 25/10; B62K 2204/00; B62J 45/00
(Continued)

(56) References Cited

U.S. PATENT DOCUMENTS

| | | | | | |
|---|---|---|---|---|---|
| 7,989,970 | B2 * | 8/2011 | Yeh | B62J 6/10 | 290/1 R |
| 2007/0090703 | A1 * | 4/2007 | Yeh | H02K 7/1876 | 310/83 |
| 2010/0270871 | A1 * | 10/2010 | Chou | H02K 7/1853 | 310/15 |

FOREIGN PATENT DOCUMENTS

| | | | | |
|---|---|---|---|---|
| CN | 106080079 A | * | 11/2016 | B60K 25/10 |
| KR | 20110113929 A | * | 10/2011 | B62J 6/12 |
| WO | WO-2004045941 A1 | * | 6/2004 | B62K 5/10 |

* cited by examiner

*Primary Examiner* — Valentin Neacsu
*Assistant Examiner* — Morgan Knauf
(74) *Attorney, Agent, or Firm* — IPLA P.A.

(57) ABSTRACT

A self-powered motorcycle or bicycle includes: a pair of shock absorber frame housings (101), each having a cylindrical hollow inside, a closed upper end portion, a split space formed at a lower end portion, rack gear moving holes (101*a*) respectively formed in both sides of the outer wall in a longitudinal direction, and self-powered generators (100) respectively mounted on both sides of the outer wall, the pair of shock absorber frame housings being mounted to face each other; a pair of shock absorber frames (102); disc-shaped partitions (102*c*) fixed in a horizontal direction; anti-rotation protrusions (104*a*) formed at both sides of the spring guide in a longitudinal direction; and anti-rotation protrusion guide holes (102*b*) formed at both sides of the shock absorber frame.

10 Claims, 8 Drawing Sheets

(51) Int. Cl.
*B62K 25/08* (2006.01)
*B62K 25/10* (2006.01)
*H02K 7/18* (2006.01)

(52) U.S. Cl.
CPC ........ *H02K 7/1853* (2013.01); *B62K 2204/00* (2013.01)

(58) Field of Classification Search
USPC .......................................................... 180/220
See application file for complete search history.

SELF-POWERED MOTORCYCLE AND BICYCLE

BACKGROUND

The present invention relates to a self-powered motorcycle or bicycle, and more particularly, to a self-powered motorcycle or bicycle, which can be self-powered and store energy by a load generated when a motorcycle or a bicycle moves, and repulsive energy supporting the load, thereby enhancing energy efficiency.

Motorcycles are divided into motorcycles using an internal combustion engine and motorcycles using a battery electricity. However, till now, motorcycles and bicycles do not convert contradictory energy generated while running into electric energy but use only fossil fuel or charged electric energy.

SUMMARY OF THE INVENTION

Accordingly, the present invention has been made in view of the above-mentioned problems occurring in the related art, and it is an object of the present invention to provide self-powered motorcycle and bicycle, which can convert mechanical motion, which is generated while a motorcycle or a bicycle is running, into electric energy and reuse the electric energy by charging a storage battery with the electric energy, thereby enhancing energy efficiency.

To accomplish the above-mentioned objects, according to the present invention, there is provided a self-powered motorcycle or bicycle, which self-generates electricity by using potential energy generated by a user's weight and a load of a body of the motorcycle or bicycle while driving and repulsive power of a wheel axle supporting and moving the potential energy and uses the generated electricity as locomotive energy, thereby enhancing energy efficiency without relying only on energy generated from an internal combustion engine or a battery.

The self-powered motorcycle or bicycle according to the present invention has the self-powered generators respectively mounted on frames connected to the wheel axle to reuse electric energy, which is self-powered by potential energy generated while driving as driving power, so that a user does not feel inconvenience in charging and the motorcycle or the bicycle can run a long distance by the same energy, thereby enhancing economic feasibility and energy efficiency in driving the motorcycle or the bicycle.

DETAILED DESCRIPTION OF THE INVENTION

With reference to the accompanying drawings, self-powered motorcycle and bicycle according to preferred embodiments of the present invention will be described in detail.

Figure 1:
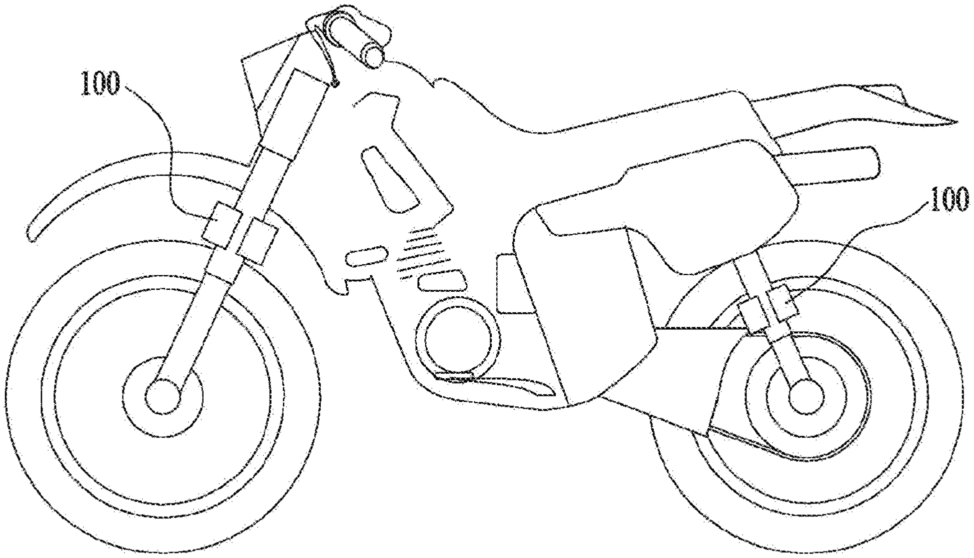
FIG. 1 is a side view of a self-powered motorcycle equipped with a self-power generator.
Figure 2:
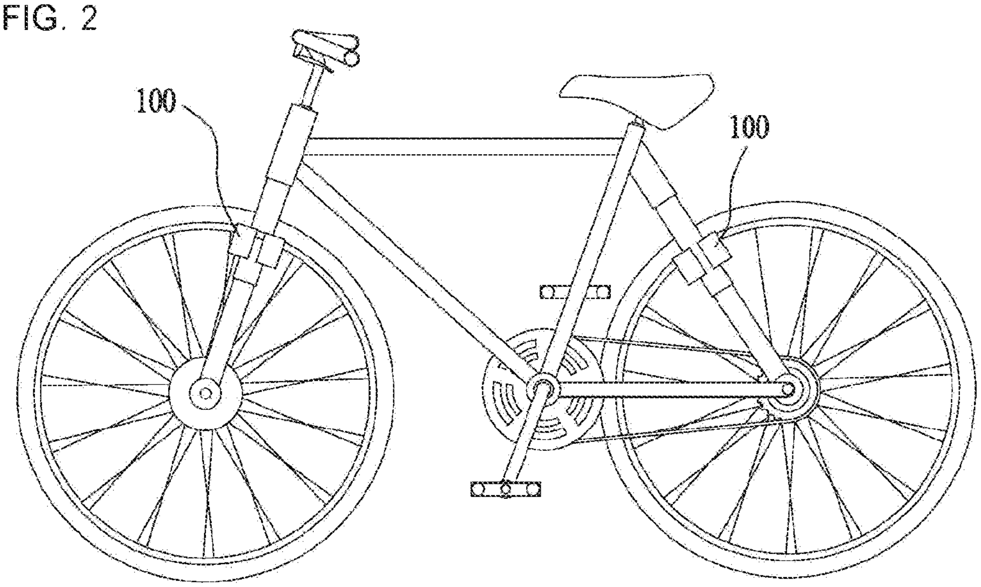
FIG. 2 is a side view of a self-powered electric bicycle equipped with a self-power generator.
Figure 3:
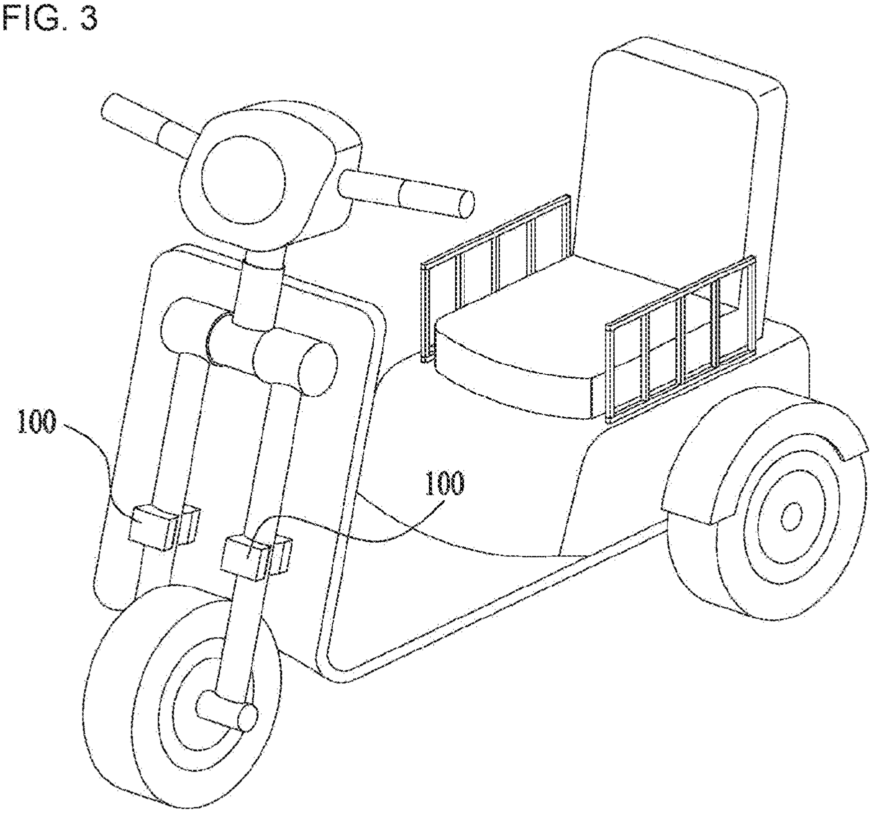
FIG. 3 is a side view of a self-powered three-wheeled electric vehicle equipped with a self-power generator.

FIGS. 1 to 3 are side views illustrating a motorcycle, a bicycle, and a three-wheeled vehicle equipped with generators.

Figure 4:
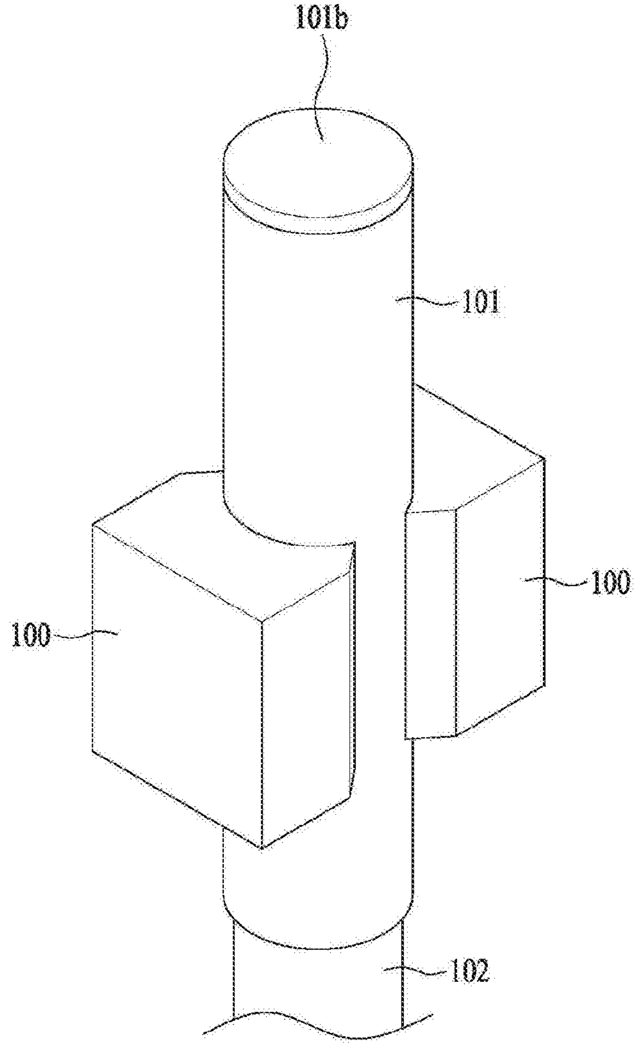
FIG. 4 is a side view of a shock absorber frame housing equipped with a self-power generator.
Figure 5:
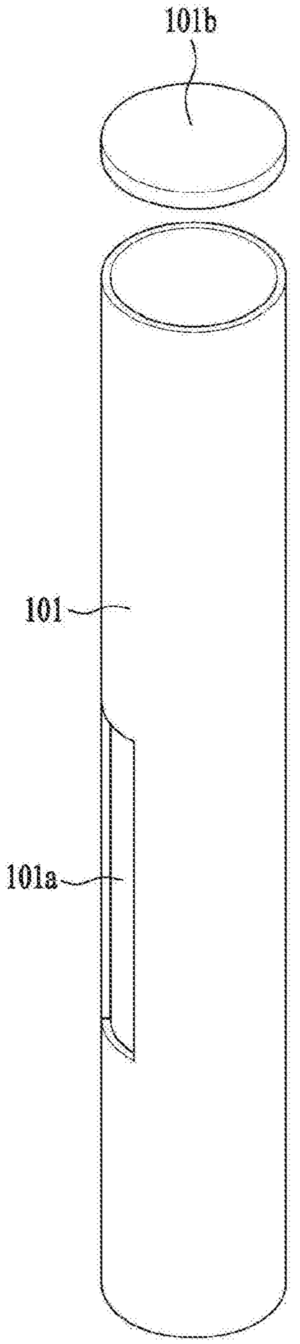
FIG. 5 is a side view of the shock absorber frame in which rack gear moving holes are respectively formed in front and rear portions.

As illustrated in FIGS. 4 and 5, a shock absorber frame housing 101, which is formed in a long cylindrical shape and has a hollow inside, includes a disc-shaped fixing plate **101*b* fixed on an upper end portion thereof so that the upper end portion is stopped. A lower end portion of the shock absorber frame housing 101 has a split space, and a shock absorber frame 102** is inserted into the lower end portion.

Rack gear moving holes **101*a* are formed in both sides of the shock absorber frame housing 101 in the longitudinal direction, and a rod which juts rack gears 102*a* attached to both sides of the shock absorber frame 102 and moves the rack gears 102*a*** in the vertical direction.

Figure 6:
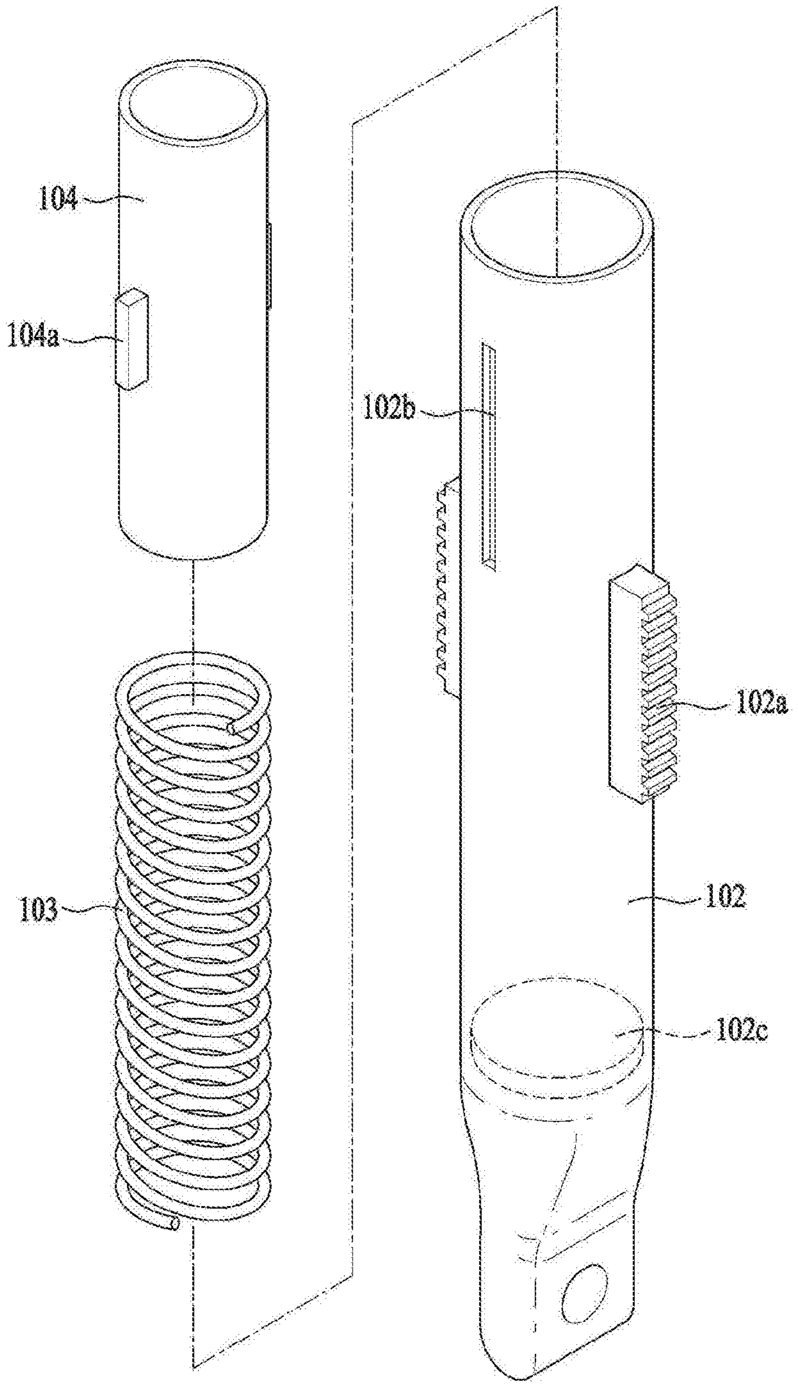
FIG. 6 is a side view of the shock absorber frame from which a spring guide and a shock absorbing spring are disassembled.

As illustrated in FIG. 6, a shock absorbing spring 103 and a spring guide 104 are inserted into the cylindrical hollow inside of the shock absorber frame 102. The shock absorber frame 102 into which the shock absorbing spring 103 and the spring guide 104 are inserted is inserted into the shock absorber frame housing 101, and a lower end portion of the shock absorber frame 102 is fixed to an end of a wheel rotating axle.

A structure in which a shock absorber frame housing 101 and a shock absorber frame 102 are coupled in the same form as the above is fixed to the other end of the wheel rotating axle. That is, a pair of the structures in each of which the shock absorber frame housing 101 and the shock absorber frame 102 are coupled are fixed at both ends of the wheel rotating axle at a predetermined interval.

The lower end portions of the pair of the coupling structures of the shock absorber frame housing and the shock absorber frame are respectively fixed at both ends of the wheel rotating axle at the predetermined interval, and the upper end portions thereof are connected horizontally by a connection member so as not to be isolated or separated from the wheel rotating axle.

The upper end portions of the coupling structures in which the shock absorber frame housing and the shock absorber frame are coupled are connected horizontally by the connection member. A vertical portion is extended upwards from the central portion of the connection member connected horizontally to a steering handle in a vertically cylindrical shape so that a front wheel and the coupling structure of the shock absorber frame housing 101 and the shock absorber frame 102 can change the direction in the left and right directions.

The connection member which is connected horizontally and extends to the handle in the vertically cylindrical shape is called a horizontal and vertical connection member 101*c*.

A vertically cylindrical middle portion of the horizontal and vertical connection member 101*c* is connected to a connection portion derived from a body of a motorcycle or a bicycle so as to receive fluctuation energy of a load repeating vertical generation while a motorcycle or a bicycle is driving.

As described above, since being connected to the body of the motorcycle or the bicycle, the connection member receives fluctuation energy of a load, including the weight of the body of the motorcycle or the bicycle and the weight of a user during driving. The received load is transmitted to the shock absorber frame housing 101, and then, is transmitted to the shock absorber 102.

As described above, the load transmitted to the shock absorber frame 102 is transmitted to the wheel axle, and then, the load transmitted to the wheel axle is transmitted to the wheel so as to be supported and moved by the wheel while landing on the ground.

The load generates repulsive power upwards while being supported and moved on the ground by the wheel. The repulsive power generated upwards is transmitted to the shock absorber frame 102 connected to the wheel axle.

As described above, the repulsive power transmitted to the shock absorber frame 102 is absorbed and resisted by the shock absorbing spring 103 and the spring guide 104 mounted inside the shock absorber frame to generate energy so that the shock absorber frame 102 is repeatedly moved in a vertical direction. The shock absorber frame 102 moving in the vertical direction repeatedly moves the rack gears 102*a*, which are fixed at both sides of the shock absorber frame, in the vertical direction.

The rack gears repeatedly moving in the vertical direction are connected to pinion gears, which are mounted on both sides of the outer wall of the shock absorber frame housing 101 and are connected to a power generator 100, to rotate the pinion gear 109, thereby rotating the power generator.

The shock absorber frame 102 includes a disc-shaped partition 102*c* fixed and attached in a horizontal direction to support the shock absorbing spring 103 inside the shock absorber frame, and the shock absorbing spring 103 for lessening shock is formed on the disc-shaped partition. The spring guide 104 for pressing the shock absorbing spring 103 is mounted on the shock absorbing spring 103, thereby reducing shock generated while driving.

An upper end portion of the spring guide 104 is fixed on the bottom surface of the disc-shaped fixing plate 101*b*, which has the same diameter as an upper end portion of the shock absorber frame housing 101, together with the upper end portion of the shock absorber frame housing 101, so that the shock absorber frame 102 inserted into the shock absorber frame housing 101 can be repeatedly moved smoothly in the vertical direction without being isolated or separated. In this instance, since a lower end portion of the spring guide is pressed to get in contact with the shock absorbing spring 103 inserted into the shock absorber frame, a shield for the purpose of pressurization is needed.

Two anti-rotation protrusions 104*a* are formed at both sides of the spring guide 104 to a predetermined length in the longitudinal direction. The shock absorber frame 102 includes anti-rotation protrusion guide holes 102*b* formed at both sides thereof to provide a rod of a size to allow the two anti-rotation protrusions 104*a* to protrude and to be movable.

In this instance, the anti-rotation protrusion guide holes 102*b* have the same width as the anti-rotation protrusions to allow a vertical movement and not to allow a horizontal movement, so that the shock absorber frame 102 cannot independently change the direction to be in the horizontal direction.

The spring guide 104 is inserted into the shock absorber frame 102, and then, is inserted into the shock absorber frame housing 101 together with the shock absorber frame 102, thereby adjusting the protrusion level of the anti-rotation protrusion 104*a* not to hinder the spring guide from being inserted into the shock absorber frame housing 101.

The self-powered generator 100 is formed to protrude out of the shock absorber frame housing 101.

The driving force of the self-powered generator uses potential energy generated while the user's weight and the load of the body of the motorcycle or the bicycle are transmitted downwards during driving, and repulsive energy of the wheel and the wheel rotating axle receiving, supporting and transmitting the potential energy.

Now, a process that the user's weight and the load of the body of the motorcycle or the bicycle are transmitted downwards during driving and a process of generating repulsive energy of the wheel and the wheel rotating axle receiving and transmitting the potential energy will be described.

During driving, the user's weight and the load of the body of the motorcycle or the bicycle are transmitted to the shock absorber frame housing connected to the self-powered generator, and the load transmitted to the shock absorber frame housing is transmitted to the spring guide 104 fixed to the disc-shaped fixing plate formed on the upper portion of the shock absorber frame housing. The energy transmitted to the spring guide 104 is simultaneously transmitted to the shock absorbing spring 103 located beneath the spring guide.

The shock absorbing spring 103 has an effect by transmitting the load to the shock absorber frame 102 having the spring therein, and the load is transmitted to the wheel and the wheel rotating axle moving on the ground while supporting the user's weight and the load of the body of the motorcycle or the bicycle.

The load transmitted to the wheel and the wheel rotating axle generates repulsive power when there is no place to go down anymore, thereby generating contradictory energy.

The generated contradictory energy is transmitted to the shock absorber frame 102 connected to the wheel rotating axle. The contradictory energy transmitted to the shock absorber frame 102 is transmitted to the rack gears fixed and attached to both sides of the shock absorber frame to actuate the rack gears in the vertical direction. The rack gears rotate the pinion gears 109 connected thereto, and the pinion gears rotate a rotor of the power generator to generate power.

Figure 7:
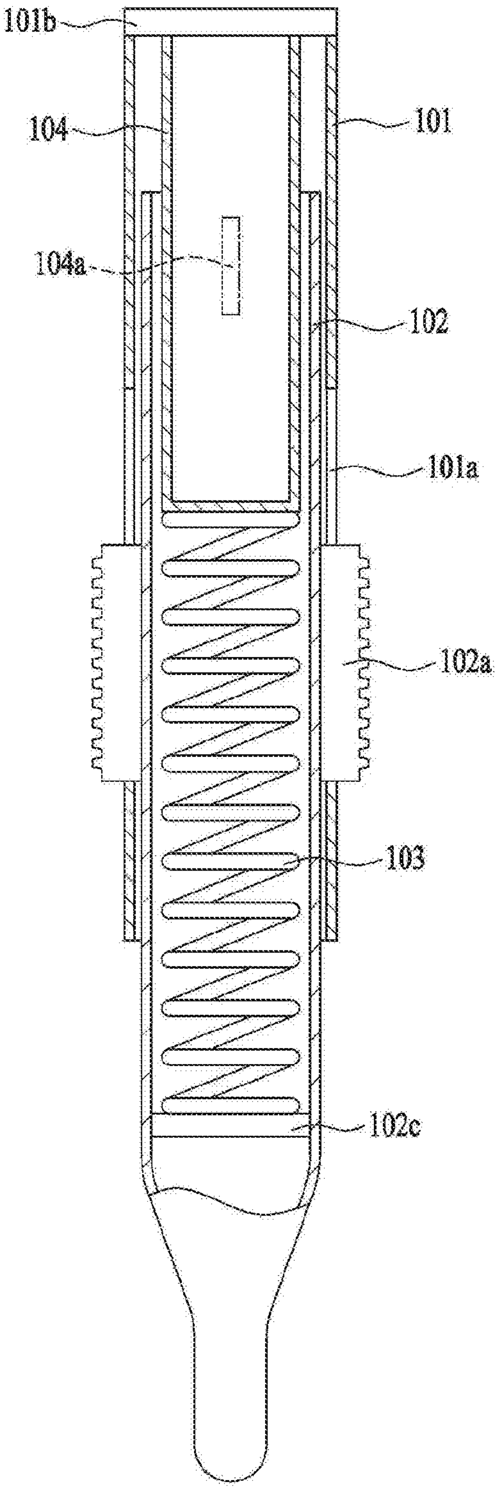
FIG. 7 is a view illustrating a state in which the shock absorber frame housing and the shock absorber frame are coupled to each other.
Figure 8:
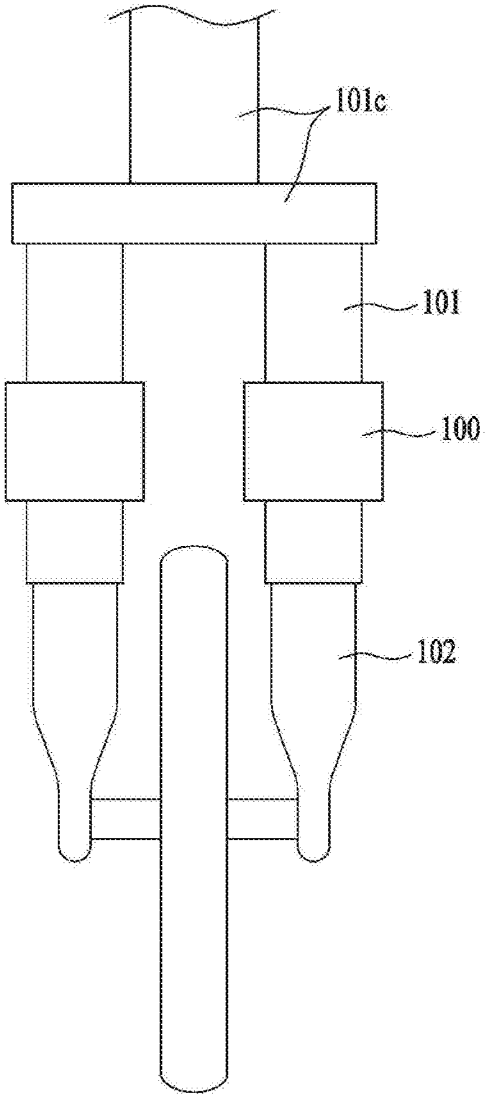
FIG. 8 is a view illustrating a state in which a wheel is disposed in between a pair of coupling structures in which the shock absorber frame and the shock absorber frame housing having the self-power generator are coupled with each other, a lower end portion of each structure is fixed to a wheel axle, and an upper portion is fixed by a horizontal and vertical connection member.
Figure 9:
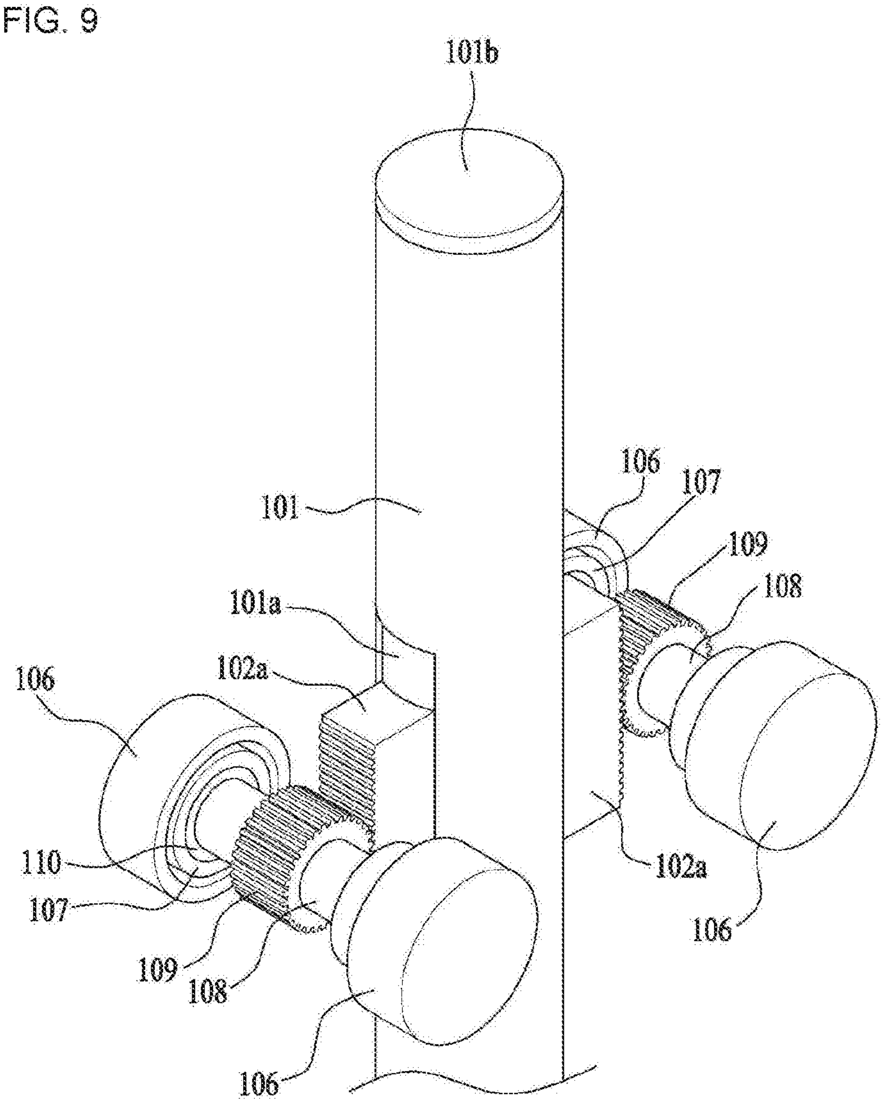
FIG. 9 is a view illustrating a state in which two self-power generators are respectively connected to rack gears.
Figure 10:
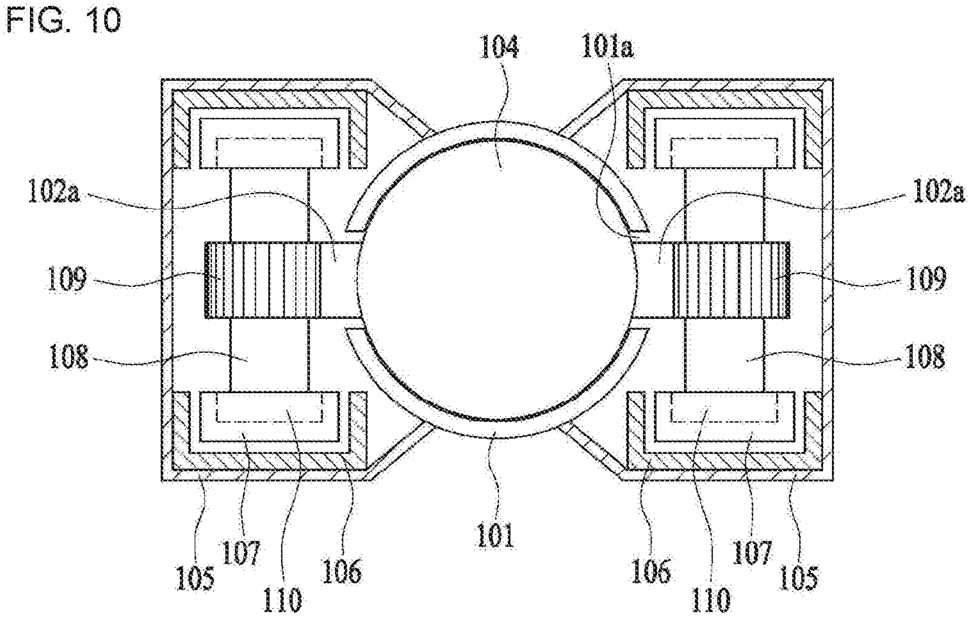
FIG. 10 is a plan view illustrating a state in which the two self-power generators are mounted in the shock absorber frame housing.

FIG. 7 is a view illustrating a state in which the shock absorber frame housing and the shock absorber frame are coupled to each other. FIG. 8 is a view illustrating a state in which a wheel is disposed in between a pair of coupling structures in which the shock absorber frame and the shock absorber frame housing having the self-power generator are coupled with each other. FIG. 9 is a view and FIG. 10 is a plan view illustrating a state in which the self-power generators are mounted around the shock absorber frame housing 101.

the self-power generators are mounted around the shock absorber frame housing 101, and a pair of stator bodies 105 are fixed to face each other, thereby safely fixing and protecting a stator 106, a rotor 107, and various members necessary for power generation.

Two stators 106 are fixed inside the stator body 105, and two rotors 107 located inside the two stators are respectively connected to rotary shafts 108, so that the pinion gears 109 are fixed and attached around the rotary shaft.

The pinion gears 109 are fixed at both sides of the shock absorber frame 102, and are engaged with the rack gears 102*a* protruding out of the rack gear moving holes 101*a* formed in both sides of the shock absorber frame housing 101.

The coupled pinion gears 109 and rack gears 102*a* are different from each other in the direction of energy of each other.

The pinion gear 109 is embedded in the stator body together with the power generator 100 to be fixed on the outer wall of the shock absorber frame housing. Since the lower end portion of the shock absorber frame is fixed to the wheel rotating axle and the upper end portion of the shock absorber frame is not fixed, the rack gears 102*a* repeatedly move in the internal space of the shock absorber frame housing in the vertical direction, thereby generating locomotive power of the rack gears formed on the outer wall.

The shock absorber frame housing 101 receives the weight of the body of the motorcycle or the bicycle and the user's weight and transmits them to the shock absorber frame 102. The shock absorber frame transmits the load to the wheel and the wheel rotating axle. The wheel generates repulsive power while supporting and moving the load energy.

The lower end portions of the shock absorber frames 102 are fixed and attached to both ends of the wheel rotating axle, and each of the shock absorber frames 102 has the shock absorbing spring 103 and the spring guide 104 embedded therein so as to absorb load energy acting downwards and generate repulsive energy in the opposite direction.

As described above, the rack gears repeatedly move in the vertical direction by the repulsive energy generated in the opposite direction, and the vertical locomotive power of the rack gears rotates the pinion gears 109 connected to the rack gears.

The pinion gears 109 formed in the middle of the rotary shaft 108, and the rotors are respectively attached to both ends of the rotary shaft.

One-way gears 110 are mounted on both ends of the rotary shaft, which is coupled to the rotor, so as to run idle in one direction, so that the rotor in the stator rotates in one direction to generate electricity.

REFERENCE NUMERALS

100: self-powered generator
101: shock absorber frame housing
101*a*: rack gear moving hole
101*b*: disc-shaped fixing plate
101*c*: horizontal and vertical connection member
102: shock absorber frame
102*a*: rack gear
102*b*: anti-rotation frame guide hole
102*c*: disc-shaped partition
103: shock absorbing spring
104: spring guide
104*a*: anti-rotation frame
105: stator body
106: stator
107: rotor
108: rotary shaft
109: pinion gear
110: one-way gear

The invention claimed is:

1. A self-powered motorcycle or bicycle comprising:

a pair of shock absorber frame housings (101), each having a cylindrical hollow inside, a closed upper end portion, a split space formed at a lower end portion, rack gear moving holes (101*a*) respectively formed in both sides of the outer wall in a longitudinal direction, and self-powered generators (100) respectively mounted on both sides of the outer wall, the pair of shock absorber frame housings being mounted to face each other;

a pair of shock absorber frames (102) of which upper end portions are respectively inserted into the cylindrical hollow interiors of the lower end portions of the two shock absorber frame housings (101) and the lower end portions are respectively fixed to both ends of a wheel rotating axle so as to interlock each other in a vertical direction;

a shock absorbing spring (103) and a spring guide (104) disposed within each shock absorber frame;

disc-shaped partitions (102*c*) disposed at lower portions of the shock absorber frame housings and defining a separation between a shock absorbing space containing the spring guide and a generator accommodation space;

anti-rotation protrusions (104*a*) formed at both sides of the spring guide in a longitudinal direction; and anti-rotation protrusion guide holes (102*b*) formed at both sides of the shock absorber frame, the anti-rotation protrusions being inserted into and movable within the guide holes, the guide holes receiving and guiding the protrusions to restrict rotation of the spring guides while permitting linear movement of the shock absorber frames, wherein the self-powered generator (100) comprises:

a pair of stator bodies (105) respectively attached to both sides of the outer wall of the shock absorber frame housing and centering the shock absorber frame housings (101), each stator body defining an internal accommodation space and having a stator disposed therein, the shock absorbing device further comprising:

a pair of rotors (107) rotatably mounted inside the stator bodies;

a rotary shaft (108), wherein the rotors (107) are integrally coupled to both ends of the rotary shaft (108), where the rotary shaft (108) rotating the pair of rotors;

one-way gears (110) mounted on the rotary shaft (108) and configured to transmit a load only when the rotary shaft rotates in the forward direction and to run idle when the rotary shaft rotates in the reverse direction;

rack gears (102*a*) respectively fixed at both sides of the outer wall of the shock absorber frame, wherein the rack gears (102*a*) protrude through rack gear moving holes (101*a*) formed in both sides of the outer wall of the shock absorber frame housing (101), and vertically interlocking along the rack gear moving holes; and pinion gears (109) formed in the middle of the rotary shaft and engaging with the rack gears (102*a*) fixed at both sides of the shock absorber frame.

2. The shock absorbing device of claim 1, wherein each disc-shaped partition forms a barrier between the shock absorbing space and the generator accommodation space.

3. The shock absorbing device of claim 1, wherein each rack gear moving hole restricts movement of its corresponding rack gear to a vertical direction.

4. The shock absorbing device of claim 1, wherein each anti-rotation protrusion guide hole extends along a portion of the length of the shock absorber frame.

5. The shock absorbing device of claim 1, wherein the anti-rotation protrusions engage the anti-rotation protrusion guide holes to maintain the spring guide in a fixed rotational orientation during linear movement.

6. The shock absorbing device of claim 1, wherein the pair of stator bodies are arranged to face each other on opposite sides of the shock absorber frame housing.

7. The shock absorbing device of claim 1, wherein each rack gear is positioned adjacent to the interior accommodation space of a stator body before engaging the rack gear moving hole.

8. The shock absorbing device of claim 1, wherein the disc-shaped partitions are formed as part of the shock absorber frame housing.

9. The shock absorbing device of claim 1, wherein the one-way gears are mounted on the rotary shaft to transmit torque during reciprocating motion of the shock absorber.

10. The shock absorbing device of claim 1, wherein each stator and rotor are arranged coaxially with the vertical movement axis of the shock absorber frames.

* * * * *